(12) United States Patent
Yamaguchi

(10) Patent No.: US 8,419,573 B2
(45) Date of Patent: Apr. 16, 2013

(54) BICYCLE REAR DERAILLEUR

(75) Inventor: Souta Yamaguchi, Sakai (JP)

(73) Assignee: Shimano Inc., Osaka (JP)

( * ) Notice: Subject to any disclaimer, the term of this patent is extended or adjusted under 35 U.S.C. 154(b) by 2304 days.

(21) Appl. No.: 11/191,030

(22) Filed: Jul. 28, 2005

(65) Prior Publication Data

US 2007/0026985 A1 Feb. 1, 2007

(51) Int. Cl.
*F16H 61/00* (2006.01)

(52) U.S. Cl.
USPC ................... 474/82; 474/78; 474/79; 474/80; 474/81; 267/155; 267/275

(58) Field of Classification Search ............ 474/69, 474/78, 80, 82; 267/155
See application file for complete search history.

(56) References Cited

U.S. PATENT DOCUMENTS

| | | | |
|---|---|---|---|
| 3,535,950 A | 10/1970 | Shimano et al. | |
| 3,847,028 A * | 11/1974 | Bergles | 474/80 |
| 3,979,962 A * | 9/1976 | Kebsch | 474/82 |
| 4,269,601 A | 5/1981 | Nagano | |
| 4,279,172 A | 7/1981 | Nagano et al. | |
| 4,306,871 A | 12/1981 | Nagano | |
| 4,437,848 A | 3/1984 | Shimano | |
| 4,470,823 A | 9/1984 | Shimano | |
| 4,690,663 A | 9/1987 | Nagano | |
| 4,801,287 A | 1/1989 | Romano | |
| 5,518,456 A | 5/1996 | Kojima et al. | |
| 5,624,334 A * | 4/1997 | Lumpkin | 474/79 |
| 5,855,529 A | 1/1999 | Sugimoto | |
| 5,857,932 A | 1/1999 | Sugimoto | |
| 5,860,880 A | 1/1999 | Oka | |
| 5,904,629 A * | 5/1999 | Oka | 474/78 |
| 5,919,106 A | 7/1999 | Ichida | |
| 6,030,307 A | 2/2000 | Oka | |
| RE36,830 E | 8/2000 | Lumpkin | |
| 6,135,905 A | 10/2000 | Soon | |
| 6,287,228 B1 | 9/2001 | Ichida | |
| 6,405,613 B1 | 6/2002 | Liim | |
| 6,419,602 B1 | 7/2002 | Soon | |
| 6,497,314 B2 | 12/2002 | Kanehisa | |
| 2004/0106482 A1 | 6/2004 | Nagano | |
| 2004/0116222 A1* | 6/2004 | Shahana et al. | 474/82 |

FOREIGN PATENT DOCUMENTS

| | | |
|---|---|---|
| CH | 326835 | 12/1957 |
| CH | 337740 | 4/1959 |
| EP | 0036317 A2 | 9/1981 |
| EP | 0878387 A2 | 11/1998 |
| EP | 1415902 | 5/2004 |

(Continued)

*Primary Examiner* — Robert A Siconolfi
*Assistant Examiner* — San Aung
(74) *Attorney, Agent, or Firm* — Global IP Counselors, LLP

(57) ABSTRACT

A bicycle rear derailleur includes a stationary member, a base member, a linkage mechanism, a movable member, a chain guide and an inner cable fixing portion. The stationary member non-movably attached to a bicycle frame and includes an outer cable receiving portion configured to receive an outer sheath of a control cable assembly. The base member is pivotally coupled to the stationary member about an axis spaced apart from a hub axis of a rear wheel. A movable member at one end of the linkage mechanism is movable relative to the base member in response to an inner cable that is attached to a portion of the linkage mechanism. The base member can move in response to tension applied by the inner cable without moving the chain guide which is coupled to the movable member.

9 Claims, 17 Drawing Sheets

FOREIGN PATENT DOCUMENTS

| | | | |
|---|---|---|---|
| FR | 2222265 | A1 | 10/1974 |
| JP | 55-91478 | A | 7/1980 |
| JP | 3249560 | B2 | 7/1980 |
| JP | 57-37082 | A | 3/1982 |
| JP | 57-144178 | A | 9/1982 |

* cited by examiner

:# BICYCLE REAR DERAILLEUR

BACKGROUND OF THE INVENTION

1. Field of the Invention

This invention generally relates to bicycle rear derailleur. More specifically, the present invention relates to bicycle rear derailleur having a member that includes a stationary member including an outer cable receiving portion configured to receive an outer sheath of a control cable assembly and a base member pivotally coupled to the member and/or a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, when a bicycle is stopped and the chain is generally stationary, it is difficult to shift gears or move the chain to a different gear. If a cyclist stops with the derailleur in a high speed gear and has failed to shift to a lower gear, the process of starting the bicycle moving can be difficult. The cyclist must shift gears while trying the get balanced on the bicycle and begin pedaling. Further, while stopped, it is not desirable to put undue tension on a shifting cable to set a desirable gear.

In view of the above, it will be apparent to those skilled in the art from this disclosure that there exists a need for an improved rear derailleur that provides the means to set a desired gear before making the bicycle move again after a stop. This invention addresses this need in the art as well as other needs, which will become apparent to those skilled in the art from this disclosure.

SUMMARY OF THE INVENTION

One object of the present invention is to provide a rear derailleur with a structure that allows for pre-shifting of gears with the chain in a generally static state relative to the rear derailleur.

The foregoing objects can basically be attained by providing a bicycle rear derailleur with a stationary member, a base member, a linkage mechanism, a movable member, a chain guide and an inner cable fixing portion. The stationary member is arranged and configured for non-movable attachment to a bicycle frame. The stationary member also including an outer cable receiving portion configured to receive an outer sheath of a control cable assembly. The base member is pivotally coupled to the stationary member about an axis spaced apart from a hub axis of a rear wheel. The linkage mechanism has a first end and a second end, the first end being coupled to the base member and the second end being movable relative to the base member. The movable member is coupled to the second end of the linkage mechanism and the chain guide coupled to the movable member. The inner cable fixing portion is coupled to the linkage mechanism and the inner cable fixing portion is arranged and configured for attachment of an inner cable of the control cable assembly.

As a result, with a chain engaged with the bicycle rear derailleur in a generally stationary, the inner cable can be adjusted to bring the derailleur in a pre-shifting orientation. In the pre-shifting orientation, the base member pivots with respect to the stationary member. Once the chain begins to move, the tension causing the base member to pivot then urges the linkage mechanism to shift, moving the chain guide to bring the chain to the selected gear.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
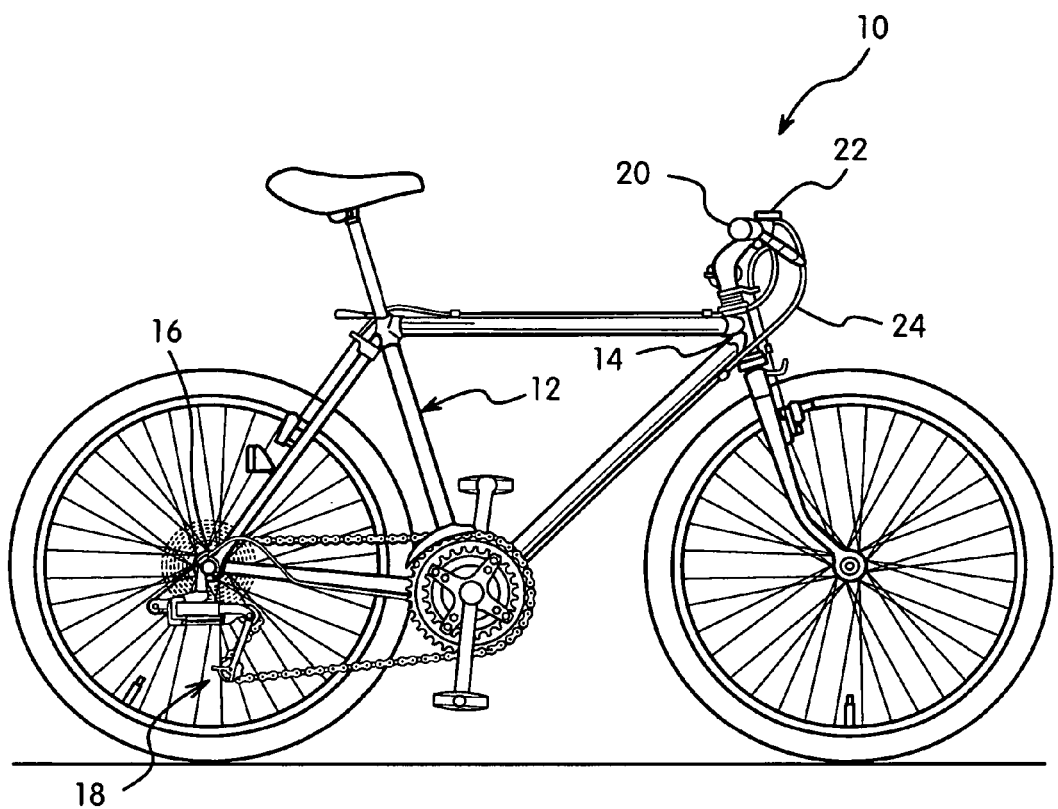
FIG. 1 is a side elevational view showing a bicycle that includes a rear derailleur in accordance with the present invention.

Referring initially to FIG. 1, a bicycle 10 is illustrated in accordance with a first embodiment of the present invention. The bicycle 10 includes a frame 12 that has a front end 14 and a rear end 16. A rear derailleur 18 in accordance with the present invention is mounted to the rear end 16 of the frame 12, as described in greater detail below.

The front end 14 of the frame 12 is coupled to and supports a handlebar 20. A gear shifting mechanism 22 is mounted to the handlebar 20. The gear shifting mechanism 22 operates in a conventional manner to control movement of the rear derailleur 18 to position a chain C between gear setting positions $P_1$ thru $P_9$ (see FIG. 18). The gear shifting mechanism 22 maintains movement control of the rear derailleur 18 via a control cable assembly 24 that extends between the gear shifting mechanism 22 and the rear derailleur 18. The control cable assembly 24 preferably includes an outer sheath 24a and an inner cable 24b, as described in greater detail below.

Figure 4:
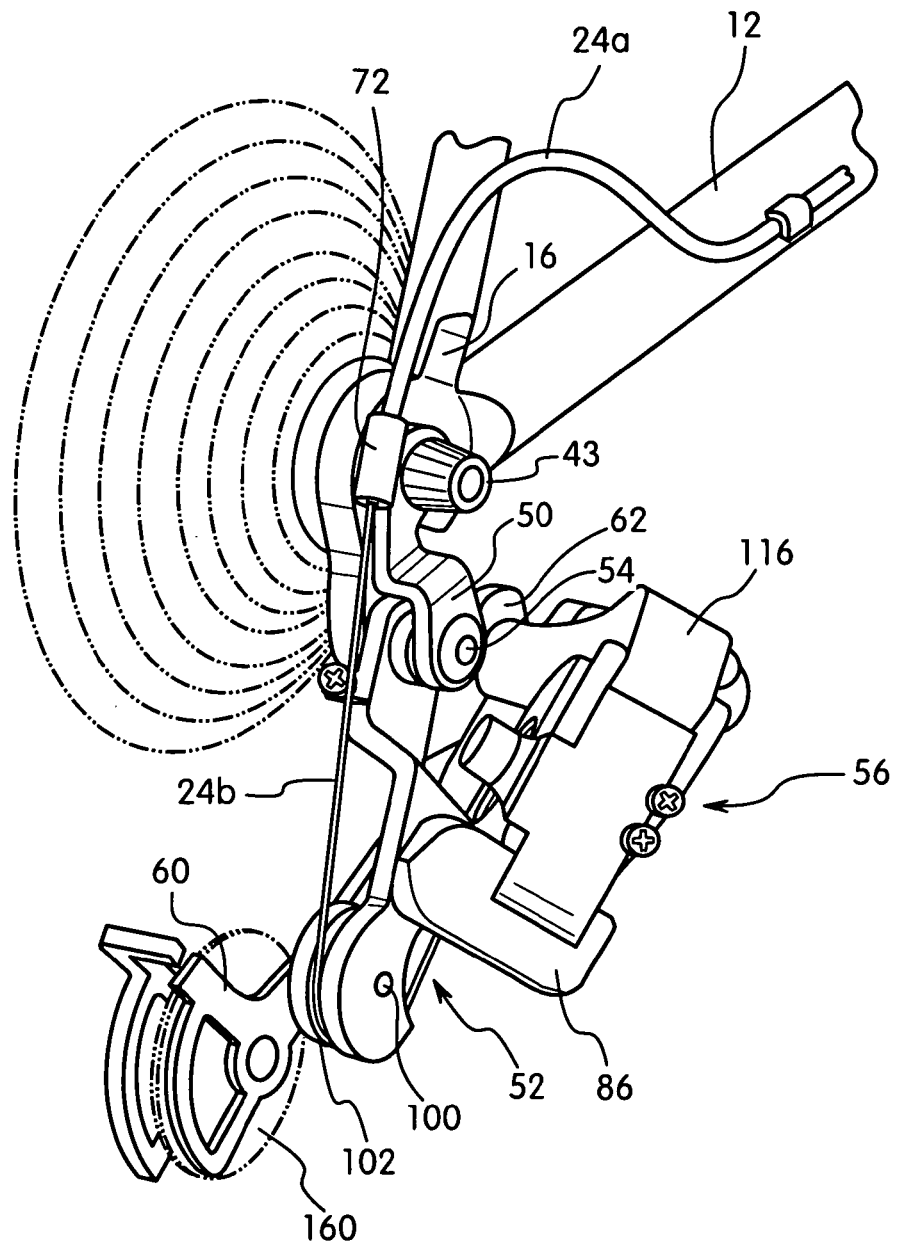
FIG. 4 is a rear perspective view of the rear portion of the bicycle and the rear derailleur in accordance with the present invention.
Figure 5:
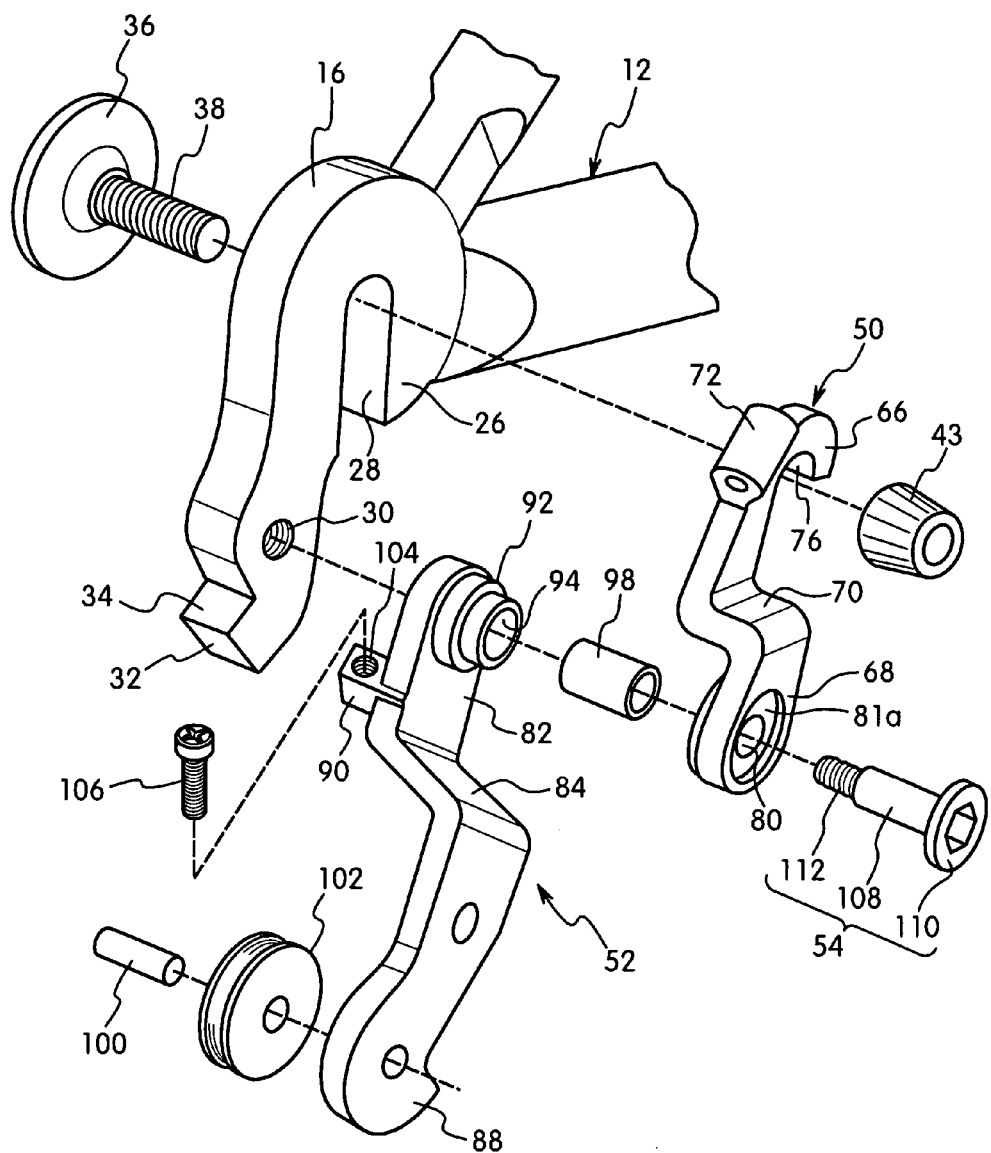
FIG. 5 is an exploded view of a portion of the rear derailleur showing a support bracket, a base member and a B-shaft in accordance with the present invention.

As shown in FIGS. 4 and 5, the rear end 16 of the frame 12 is formed with a rear wheel support portion 26. As shown in FIG. 5, the rear wheel support portion 26 includes a rear wheel slot 28, a threaded aperture 30 and an adjuster receiving protrusion 32. The adjuster receiving protrusion 32 is formed with an adjuster engaging surface 34. The threaded aperture 30 is spaced apart from and is positioned generally vertically below and rearward from the rear wheel slot 28, relative to the bicycle frame 12. The threaded aperture 30 serves as a derailleur support aperture for supporting a B-shaft of the derailleur 18, as is described in greater detail below.

Figure 2:
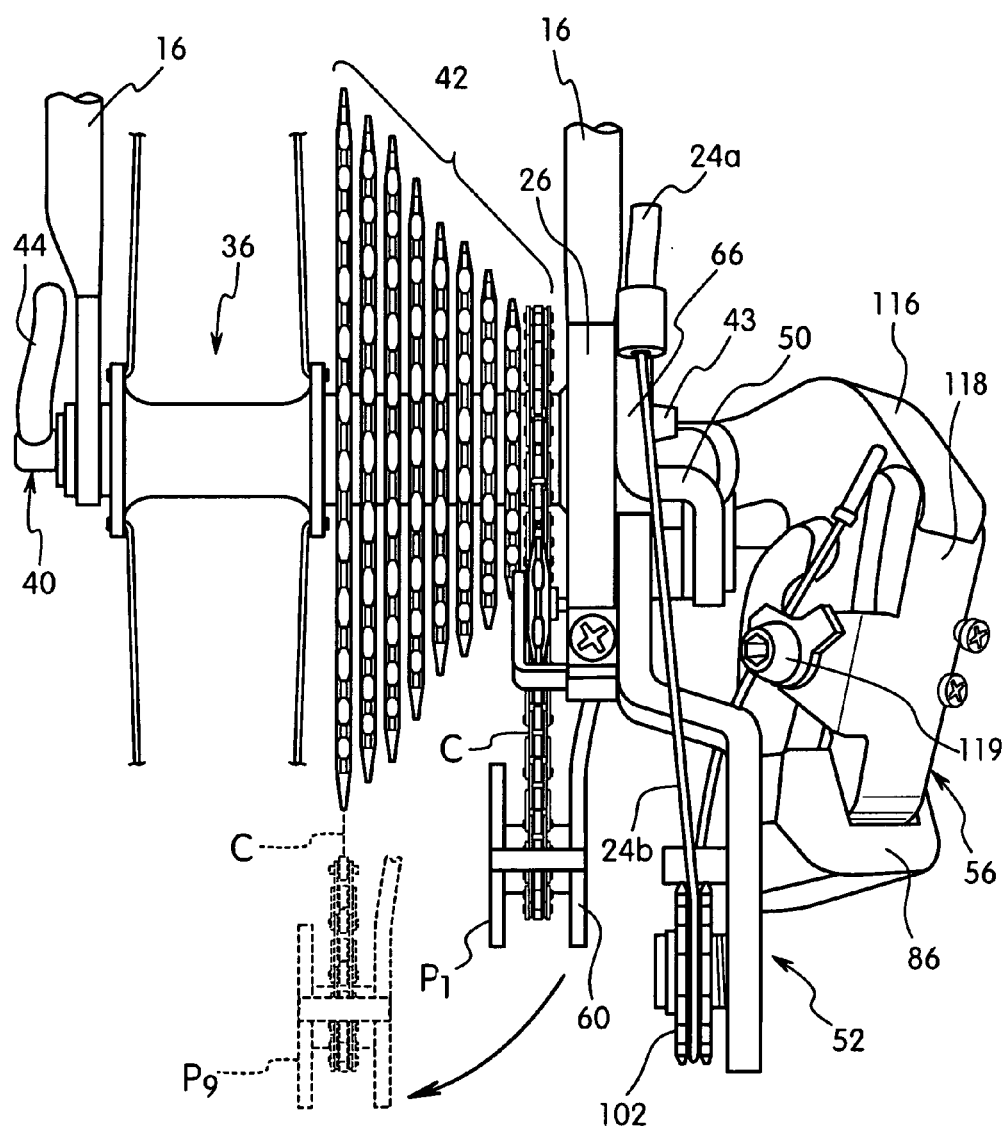
FIG. 2 is a fragmentary rear elevational view showing a portion of the rear wheel of the bicycle, including a gear set and the rear derailleur in accordance with the present invention.

The rear wheel support portion 26 supports a rear wheel 36. The rear wheel 36 includes a rear wheel axle 38 which forms a part of a quick release axle assembly 40. The rear wheel axle 38 further supports a conventional gear sprocket set 42, as shown in FIG. 2. The quick release axle assembly 40 includes the rear wheel axle 38, a nut 43 and a quick release lever 44 providing for easy removal and installation of the rear wheel 36.

The rear derailleur 18 is mounted to the rear wheel support portion 26 adjacent to the gear sprocket set 42 allowing rapid installation and removal of the rear wheel 36, in a manner described in greater detail below.

Figure 8:
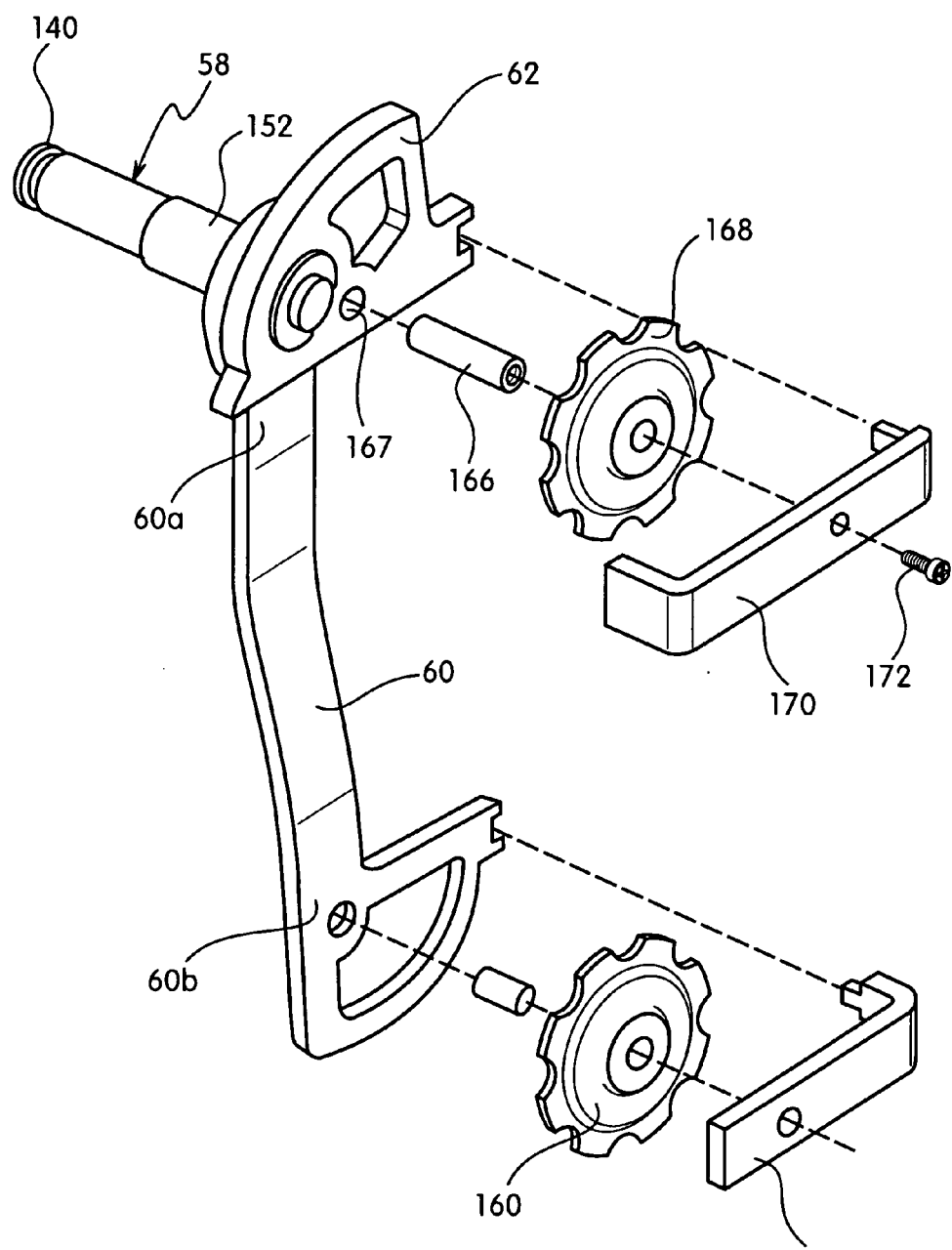
FIG. 8 is another exploded view showing a tension plate, a guide plate, a tensioning pulley and a guide pulley shown removed from the rear derailleur in accordance with the present invention.
Figure 9:
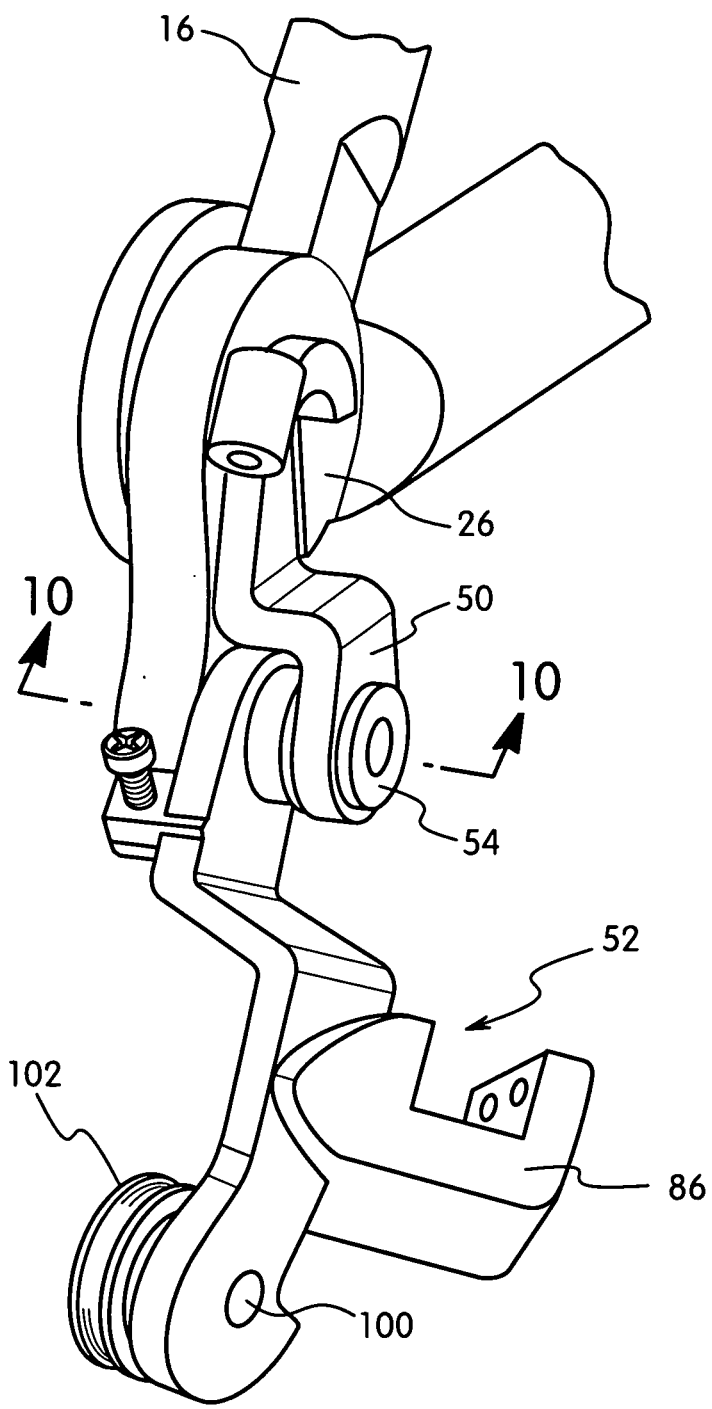
FIG. 9 is another rear perspective view showing a portion of a frame of the bicycle, the support bracket, the base member, the B-shaft and a portion of the derailleur linkage assembly with other portions of the derailleur removed to provide greater clarity, in accordance with the present invention.

Referring now to FIGS. 2-5 and 8, the rear derailleur 18 basically includes a support bracket 50, a base member 52, a support shaft 54 shown in FIG. 5 (also referred to as the B-shaft), a derailleur linkage assembly 56, a movable member 116, a pivot shaft 58 shown in FIG. 8 (also referred to as a P-shaft), a tension plate 60 and a guide plate 62. The support bracket 50, the base member 52 and the support shaft 54 basically constitute a base portion that supports the rear derailleur 18 on the rear wheel support portion 26 of the rear end 16 of the frame 12.

Referring again to FIG. 5, the support bracket 50 is a stationary member with the rear derailleur 18 installed on the bicycle 10. The support bracket 50 basically includes a first end 66, a second end 68, a bent portion 70 and a cable guide portion 72. The first end 66 is a first mounting portion that is configured for releasable attachment to the rear wheel axle 38. Specifically, the first end 66 is formed with a hook-like configuration or shape that defines a recess 76. When support bracket 50 is installed on the rear wheel support portion 26 of the rear end 16 of the frame 12, the recess 76 is preferably aligned with the rear wheel slot 28 in the rear wheel support portion 26, as shown in FIG. 5. Therefore, when the rear wheel axle 38 is installed in the rear wheel slot 28, the rear wheel axle 38 also extends into the recess 76. When the quick release axle assembly 40 is tightened in a conventional manner, the first end 66 is pressed and retained in position against the rear wheel support portion 26 of the frame 12. Further, when the quick release axle assembly 40 is released, the rear wheel axle 38 is easily removed from the rear wheel support portion 26 without removing the rear derailleur 18. Hence, the first end 66 engages and is held in position by the rear wheel axle 38.

The rear wheel axle 38 is installed in the rear wheel slots 28 of the rear wheel support portion 26, as indicated in FIGS. 4 and 5. Since the quick release axle assembly 40 is included with the rear wheel 36, the rear wheel 36 can be quickly removed and installed on the frame 12 by manipulation of the quick release lever 44.

The first end 66 also has a generally flat plate-like shape such that the first end 66 makes solid planar contact with the rear wheel support portion 26 and the nut 43, as indicated in FIG. 2. The second end 68 of the support bracket 50 is a second mounting portion. The second end 68 a generally flat plate-like shape and includes an aperture 80, a first recess 81a (FIGS. 5 and 10) and a second recess 81b (FIG. 10) formed therein. The aperture 80 is co-axially aligned with the first and second recesses 81a and 81b. The bent portion 70 is formed between the first end 66 and the second end 68. The bent portion 70 extends between the first end 66 and second end 68 providing a planar or lateral offset to the first end 66 and the second end 68. Specifically, the first end 66 and the second end 68 are generally parallel to one another but are space apart by a distance corresponding to the length of the bent portion 70. Further, the first end 66 of the support bracket 50 is axially offset from the second end 68 relative to an axial direction of the support shaft 54. As well, the first end 66 of the support bracket 50 is horizontally and vertically offset from the second end 68 when installed on the rear end 16 of the frame 12, as shown in FIGS. 2 and 5.

Again with reference to FIG. 5, the cable guide portion 72 is formed on an upper region of the first end 66 of the support bracket 50. The cable guide portion 72 is an outer cable receiving portion that includes a hollow interior through which the inner cable 24b of control cable assembly 24 extends. The outer sheath 24a can be inserted into the cable guide portion 72 and abut an inner annular projection (not shown) that restricts movement of the outer sheath 24a but allows the inner cable 24b to extend therethrough.

As shown in FIGS. 4 and 5, the base member 52 basically includes a support end 82 (a support portion), a bent portion 84, a linkage assembly connection portion 86, a cable idler pulley end 88 and an adjuster extension 90 that are all integrally formed as a single member.

The support end 82 of the base member 52 has a generally flat plate-like shape and contour but is formed with an annular protrusion 92 that extends perpendicularly away from the support end 82. The annular protrusion 92 can be integrally formed with the support end 82 of the base member 52. Alternatively the annular protrusion 92 can be formed as a separate member that engages the support end 82 of the base member 52. An aperture 94 (or apertures) extends through the annular protrusion 92 and the support end 82 of the base member 52.

Figure 10:
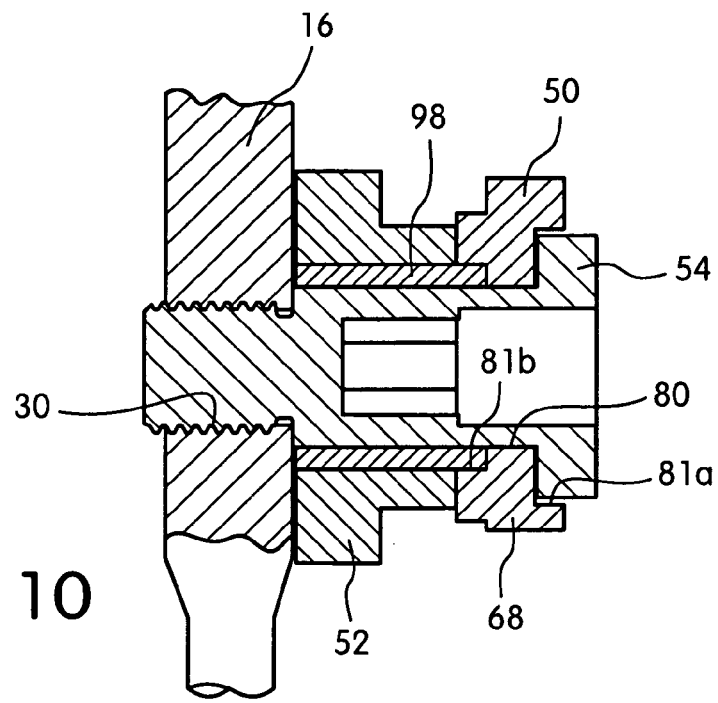
FIG. 10 is a cross-sectional view of a portion of the rear derailleur taken along the line 10-10 in FIG. 9, showing details of the B-shaft, support bracket and the base member in accordance with the present invention.

The support end 82 also includes a bushing 98 that is fitted within the aperture 94 in the support end 82 of the base member 52. The bushing 98 is longer than the aperture 94 and the annular protrusion 92 and extends at least partially into the second recess 81b formed in the second end 68 of the support bracket 50, as shown in FIG. 10. With the rear derailleur 18 installed on the frame 12 of the bicycle 10, the aperture 94 is aligned with the threaded aperture 30 in the rear wheel support portion 26 of the rear end 16 of the frame 12. Further, the aperture 80 in the second end 68 of the support bracket 50 is also preferably aligned with the aperture 94 and the threaded aperture 30.

It should be understood from the drawings that the first end 66 of the support bracket 50 and the support end 82 of the base member 52 are generally co-planar when installed on the rear end 16 of the frame 12.

The bent portion 84 of the base member 52 extends between the linkage assembly connection portion 86 and the support end 82 of the base member 52. Specifically, the bent portion 84 provides a planar offset between the linkage assembly connection portion 86 and the support end 82. As should be clearly understood from the drawings, the linkage assembly connection portion 86 and the support end 82 are offset from one another by the bent portion 84.

The linkage assembly connection portion 86 is axially, horizontally and vertically offset from the support end 82 of the base member, relative to the frame 12 and relative to an axial direction of the support shaft 54, as shown in FIGS. 2, 4 and 5. The linkage assembly connection portion supports a portion of the derailleur linkage assembly 56 in a manner described in greater detail below. The linkage assembly connection portion 86 is located between the cable idler pulley end 88 and the support end 82 of the base member 52.

The cable idler pulley end 88 of the base member 52 has a shaft 100 mounted thereon and a cable idler pulley 102 installed on the shaft 100. As shown in FIG. 4, the inner cable 24b of the control cable assembly 24 extends from the cable guide portion 72 of the support bracket 50 around the cable idler pulley 102 and then connects to the derailleur linkage assembly 56 in a manner described below.

The adjuster extension 90 is preferably formed on or proximate the support end 82 of the base member 52. The adjuster extension 90 extends in a direction away from the second end 68 of the support bracket 50. The adjuster extension 90 is basically a protrusion that is formed with a threaded aperture 104 that extends in a direction generally perpendicular to the support shaft 54. The threaded aperture 104 is configured to receive an adjuster screw 106. When assembled, the adjuster screw 106 contacts the adjuster engaging surface 34 of the adjuster receiving protrusion 32 on the rear wheel support portion 26 of the rear end 16 of the frame 12. The adjuster screw 106 provides a simple structure for adjusting an angular stop position of the base member 52 and the derailleur linkage assembly 56 relative to the support bracket 50 and the frame 12.

The support shaft 54 serves as a B-shaft for the rear derailleur 18 and includes a shaft portion 108, a head portion 110 and a threaded portion 112. The shaft portion 108 is dimensioned to extend through the aperture 80 and the bushing 98 in the aperture 94 of the support end 82 of the base member 52. The head portion 110 at least partially extends into the first recess 81a on the support bracket 50 to restrict axial movement of the rear derailleur 18 with respect to the support bracket 50, as shown in FIG. 10. The threaded portion 112 is configured to thread into the threaded aperture 30 in the rear wheel support portion 26. By tightening the threaded portion 112 into the threaded aperture 30, the head portion 110 presses against the support bracket 50. As a result, the support end 82 of the base member 52 is confined between the support bracket 50 and the rear wheel support portion 26 of the rear end 16 of the frame 12. However, the bushing 98 is dimensioned to prevent the support bracket 50 from pressing against the base member 52. Specifically, the base member 52 can still rotate or pivot about the bushing 98 even with the support shaft 54 fully tightened. Hence, the second end 68 of the support bracket 50, the rear wheel support portion 26 of the rear end 16 and the support shaft 54 provide pivotal support for the base member 52.

It should be understood that the tension of the chain C biases the base member 52 such that the adjuster screw 106 is urged into contact with the adjuster engaging surface 34 of the rear wheel support portion 26. Therefore, the adjuster screw 106 engaged with the adjuster engaging surface 34 limits counter clockwise rotational movement of the base member 52 relative to the rear end 16 of the frame 12.

Figure 3:
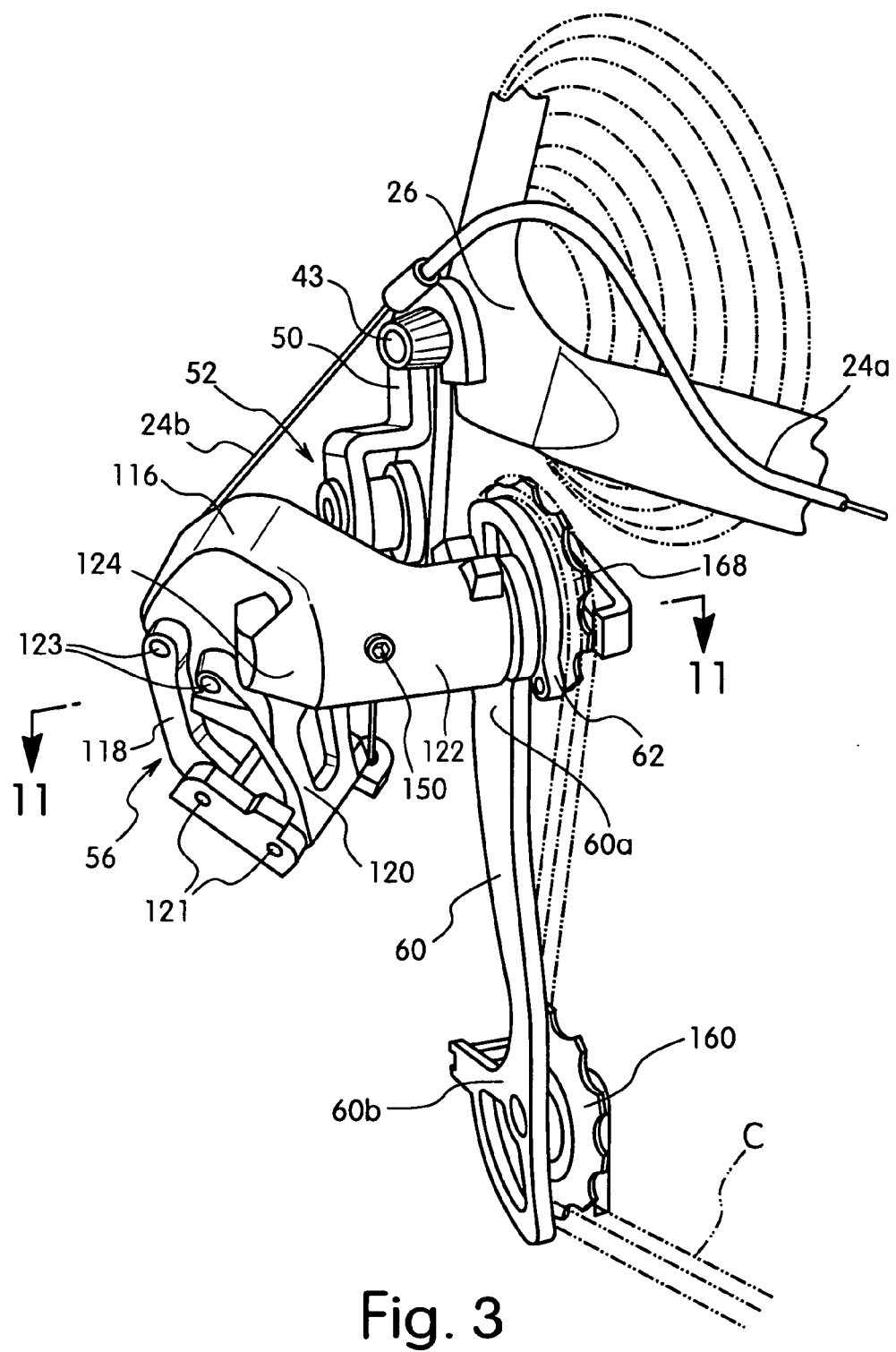
FIG. 3 is a front perspective view of a rear portion of the bicycle showing the rear derailleur in accordance with the present invention.
Figure 6:
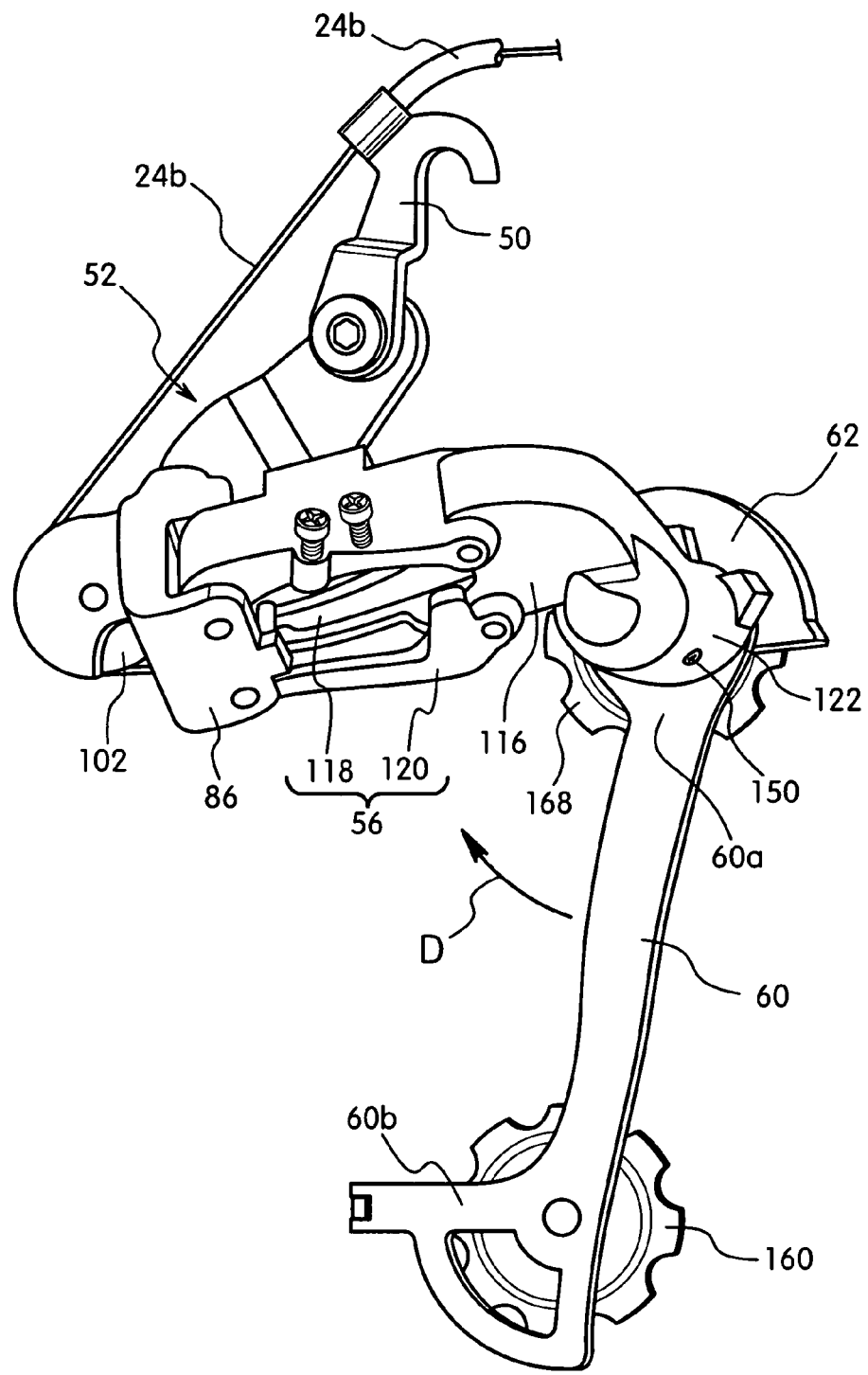
FIG. 6 is a side view of an outward side of the rear derailleur shown removed from the bicycle in accordance with the present invention.
Figure 7:
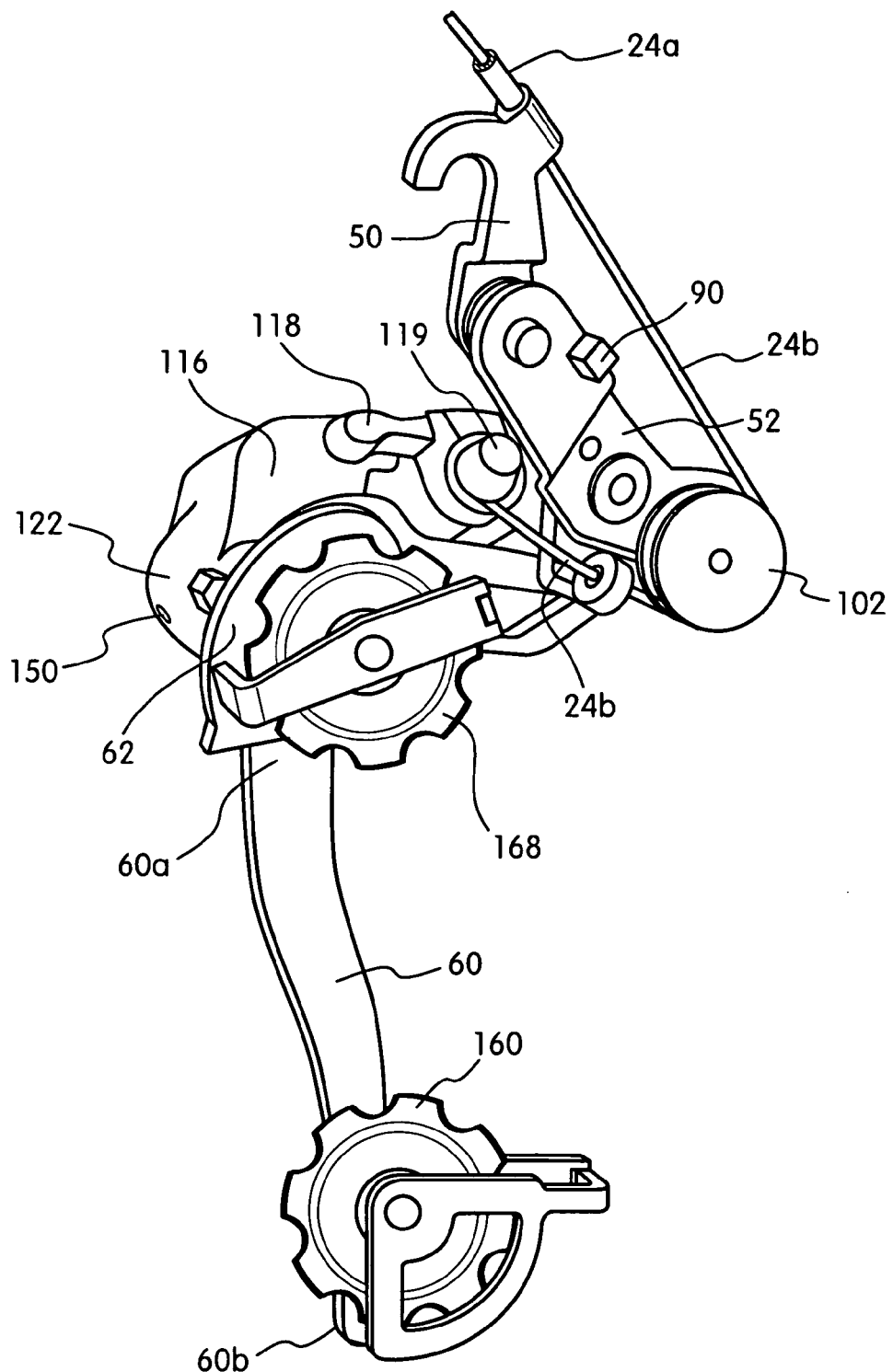
FIG. 7 is a side view of an inward side of the rear derailleur shown removed from the bicycle in accordance with the present invention.

As shown in FIGS. 3, 4 and 6, the derailleur linkage assembly 56 operates in a conventional manner and therefore only a limited description is provided herein for brevity. The derailleur linkage assembly 56 is a coupling mechanism. The derailleur linkage assembly 56 basically includes a first pivot link 118 and a second pivot link 120. First ends of the first and second pivot link 118, 120 are movably coupled to the linkage assembly connection portion 86 of the base member 52.

Figure 18:
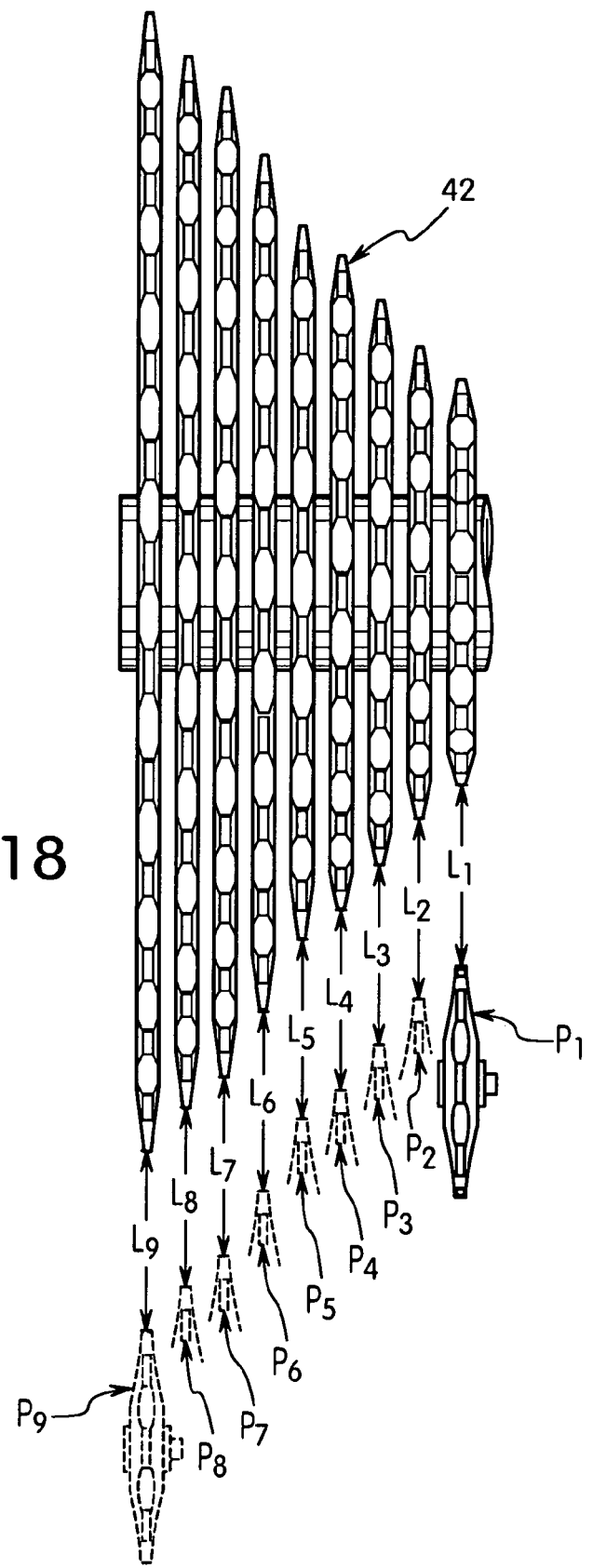
FIG. 18 is a schematic rear view of the gear set and guide pulley of the rear derailleur showing the approximate distance between each gear sprocket of the gear sprocket set and the guide pulley in accordance with the present invention.

The movable member 116 is movably coupled to second ends of the first pivot link 118 and the second pivot link 120 in a conventional manner. Specifically, the first pivot link 118 and the second pivot link 120 can pivot about parallel pivot pins 121 supported on the linkage assembly connection portion 86 of the base member 52 and can also pivot about parallel pivot pins 123 supported on the movable member 116. The first pivot link 118 includes a cable attachment portion (an inner cable fixing portion) 119. The inner cable 24b is attached to cable attachment portion 119 on the first pivot link 118 such that as the cable is tightened or loosened, the movable member 116 is selectively moved relative to the base member 52 between a plurality of gear setting positions $P_1$ thru $P_9$, as indicated in FIGS. 2 and 18. The pivot pins 121 and 123 extend in a direction that is inclined with respect to the rear wheel axle 38. Consequently, movement of the inner cable 24b by manipulation of the gear shifting mechanism 22 cause the movable member 116 to move upward and outward or downwardly and inwardly with respect to the base member 52 and the frame 12 of the bicycle 10.

It should be understood from the drawings and the description herein that the first and second pivot links 118 and 120 are biased by a spring (not shown) to urge the movable member 116 to maintain the chain C in the gear setting position $P_1$. Consequently, pulling the inner cable 24b causes the chain C to move from, for example, gear setting position $P_1$ to a selected one of gear setting positions $P_2$ thru $P_9$. When the inner cable 24b is released, the spring (not shown) urges the movable member 116 in a direction bringing the chain C toward or into gear setting position $P_1$.

Figure 11:
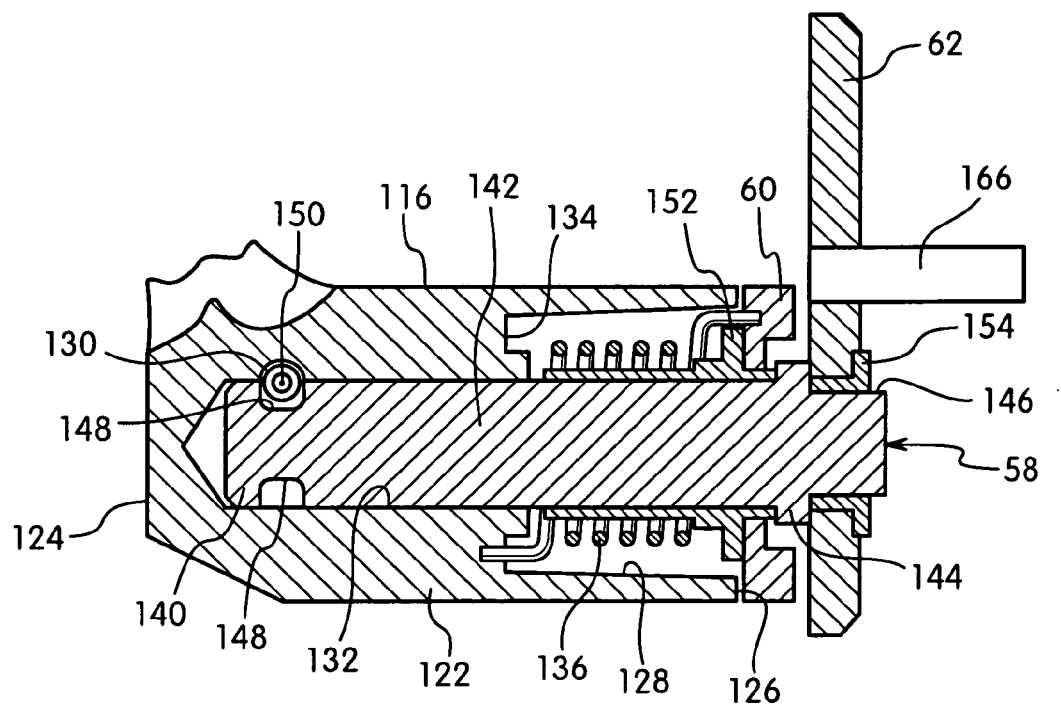
FIG. 11 is a cross-sectional view of another portion of the rear derailleur taken along the line 11-11 in FIG. 3, showing details of a pivot shaft that supports the tension plate and the guide plate, and a pulley shaft that supports the guide pulley in accordance with the present invention.

As shown in FIG. 11, the movable member 116 includes a pivot shaft supporting portion 122. The pivot shaft supporting portion 122 is generally cylindrical in shape and includes an outer side 124, a bicycle frame facing side 126, a partially hollow interior 128 and a retaining aperture 130 that extends into the hollow interior 128. The hollow interior 128 includes a shaft receiving portion 132 and a spring retaining recess 134. The spring retaining recess 134 has an inner diameter that is larger than an inner diameter of the shaft receiving portion 132, as indicated in FIG. 11. A biasing spring 136 is retained within the spring retaining recess 134. One end of the biasing spring 136 is engaged with the tension plate 60 and the other end of the biasing spring 136 is engaged with the spring retaining recess 134. The retaining aperture 130 is oriented generally perpendicular to shaft receiving portion 132.

As shown in FIGS. 8 and 11, the pivot shaft 58 (also known as a P-shaft) is coupled to and supported within the pivot shaft supporting portion 122. As shown in FIG. 11, the pivot shaft 58 basically includes a retaining end 140, a bushing supporting portion 142, an annular protrusion 144 and a guide plate supporting end 146. The pivot shaft supporting portion 122 of the movable member 116 is configured with respect to the pivot pins 121 and 123 such that the orientation of the pivot shaft 58 is generally parallel to the support shaft 54 in each of the gear setting positions $P_1$ thru $P_9$.

The retaining end 140 is formed with an annular recess 148. A retaining bolt 150 extending through the retaining aperture 130 of the pivot shaft supporting portion 122 further extends into a portion of the annular recess 148 of the pivot shaft 58 restricting axial movement of pivot shaft 58.

The bushing supporting portion 142 supports a tension plate bushing 152 that is fitted thereon. The tension plate bushing 152 in turn rotatably supports the tension plate 60 on the retaining bolt 150.

The guide plate supporting end 146 is fitted with a guide plate supporting bushing 154 fixed to the guide plate supporting end of pivot shaft 58. The annular protrusion 144 separates the tension plate bushing 152 and the tension plate 60 from the guide plate supporting bushing 154 and the guide plate 62. It should be understood from FIG. 11 that the tension plate 60 can be press fitted on to the tension plate bushing 152 and the tension plate bushing 152 can freely rotate about the pivot shaft 58. Alternatively, the tension plate 60 can be loose fitted around the tension plate bushing 152 and the tension plate bushing 152 press fitted onto the pivot shaft 58.

As shown in FIGS. 3, 6, 7 and 8, the tension plate 60 has a first end 60a and a second end 60b. The first end 60a is offset from the second end 60b. In other words, the tension plate 60 is not flat throughout its length. Specifically, the first end 60a is offset from the second end 60b by a distance approximately equal to or slightly greater than the thickness of the guide plate 62.

As shown in FIGS. 3 and 11, the tension plate 60 is rotatably fixed to the pivot shaft 58. The tension plate 60 is therefore pivotally attached to the movable member 116. Further, the tension plate 60 is disposed on the bicycle frame facing side 126 of the pivot shaft supporting portion 122. The tension plate 60 is spring biased by the biasing spring 136 for movement in a chain tensioning direction D (as shown in FIG. 6) relative to the pivot shaft supporting portion 122 of the movable member 116. Specifically, one end of the biasing spring 136 engages the hollow interior 128 of the pivot shaft supporting portion 122 and the other end of the biasing spring 136 engages the tension pulley 60. The tension plate 60 rotatably supports a tensioning plate 160 and a chain retainer 162, as shown in FIG. 8.

As shown in FIG. 11, the guide plate 62 is supported on the pivot shaft 58 independent from the spring 136 biasing the tension plate 60. The guide plate 62 is rotatably fixed to the pivot shaft 58 by the guide plate supporting bushing 154. The guide plate supporting bushing 154 is press fitted onto the pivot shaft 58 with the guide plate installed on the guide plate supporting bushing 154. However, the guide plate 62 is free to rotate on the guide plate supporting bushing 154 relative to the pivot shaft 58. As indicated in FIG. 11, the guide plate 62 is disposed adjacent to the tension plate 60 but is free to rotate independently of the tension plate 60. Further, the tension plate 60 is disposed between the guide plate 62 and the bicycle frame facing side 126 of the pivot shaft supporting portion 122 of the movable member 116.

As shown in FIGS. 8 and 11, the guide plate 62 supports a pulley shaft 166 that is spaced apart from and generally parallel to the pivot shaft 58. The pulley shaft 166 is press fitted into an aperture 167 formed in the guide plate 62. The pulley shaft 166 rotatably supports a chain guiding pulley 168 mounted on the pulley shaft 166. A chain retaining plate 170 is fixed to the pulley shaft 166 by a fastener 172, as indicated in FIG. 8. The chain retaining plate 170 interlocks with a rearward portion of the guide plate 62 thereby preventing rotation of the chain retaining plate 170 with respect to the guide plate 62. The chain retaining plate 170 is spaced apart from the guide plate 62 with the chain guiding pulley 168 disposed there between.

It should be understood from the drawings and the description herein that the chain guiding pulley 168 and the tensioning pulley 160 are generally co-planar. The offset between the first end 60a and the second end 60b of the tension plate 60 is dimensioned to ensure that the chain guiding pulley 168 and the tensioning pulley 160 are approximately or generally co-planar.

The chain guiding pulley 168 is configured to selectively guide the chain C onto one of the gear rings in the gear sprocket set 42. Specifically, the gear shifting mechanism 22 is used by a cyclist to move the inner cable 24b changing the orientation of the first pivot link 118 and the second pivot link 120, thereby moving the movable member 116. Movement of the movable member 116 causes the chain guiding pulley 168 to move the chain C between the gear setting positions $P_1$ thru $P_9$. For example, in the gear setting position $P_1$, the chain C engages the rightmost gear ring in the gear sprocket set 42 shown in solid lines in FIG. 2. With the gear shifting mechanism 22 manipulated accordingly, the chain C is moved to engage the leftmost gear ring in the gear sprocket set 42 or the gear setting position $P_9$ as shown in dashed lines in FIG. 2.

Figure 12:
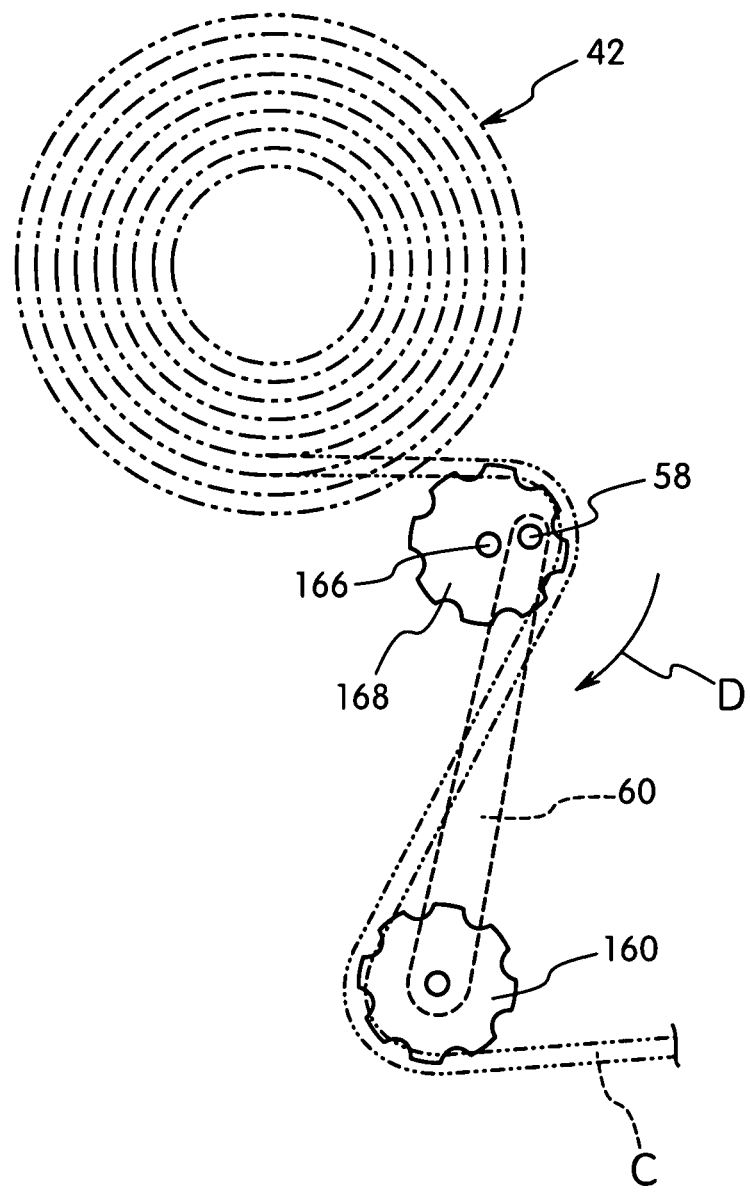
FIG. 12 is a schematic side view of the rear portion of the bicycle showing the guide pulley and the tensioning pulley of the rear derailleur, along with a gear set and a chain of the bicycle in accordance with the present invention.
Figure 15:
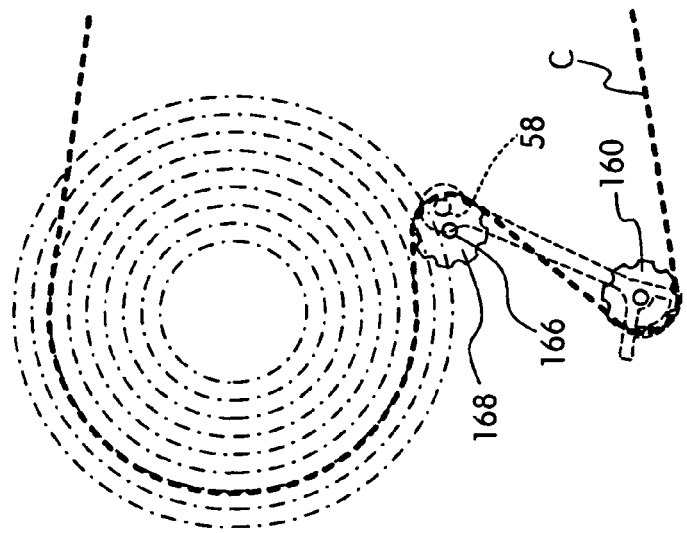
FIGS. 13, 14 and 15 are schematic drawings showing pivoting movement of the pulley shaft relative to the pivot shaft in several gear setting positions in accordance with the present invention.
Figure 14:
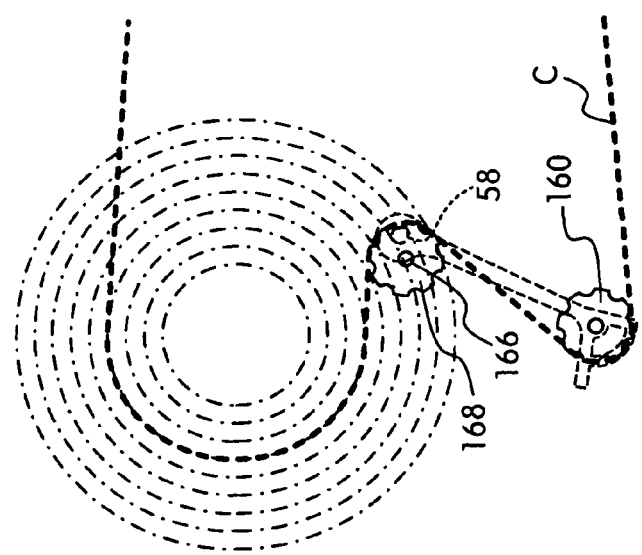
Figure 13:
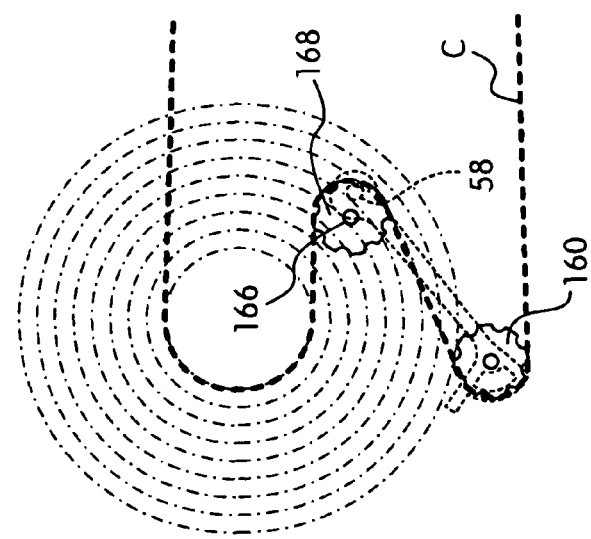

As shown in FIGS. 11-15, the guide plate 62 pivots about the pivot shaft 58. As the chain C changes locations and shifts to a different gear ring or gear setting position with respect to the gear sprocket set 42, the guide plate 62 can pivot about the pivot shaft 58. The guide plate 62 can pivot in this manner because the pulley shaft 166 is spaced apart from the pivot shaft 58. Further, the biasing spring 136 applies the biasing force to the tension plate 60, causing the tension plate 60 to apply a force against the chain C in the chain tensioning direction D (FIGS. 6 and 12). The chain C remains taut about the tensioning pulley 160, the chain guiding pulley 168 and the selected gear of the gear sprocket set 42 because of the biasing force acting on the tension plate 60. The chain C also applies the chain biasing force from the tension plate 60 to the chain guiding pulley 168. The pulley shaft 166 supports the chain guiding pulley 168. Since the pulley shaft 166 is spaced apart from the pivot shaft 58, the forces acting on the chain guiding pulley 168 cause the guiding plate 62 to pivot about the pivot shaft 58 to, for example, the approximate positions depicted in FIGS. 13, 14 and 15.

Since the guide pulley 168 rotates about the pulley shaft 166 on the guide plate 62, and the guide plate 62 pivots about the pivot shaft 58, the guide pulley 168 has a small freedom of up and down movement with respect to the gears on the gear sprocket set 42. The configuration and orientation of the pivot pins 121 and 123 providing movement of the movable member 116 combined with the pivoting movement of the guide plate 62 provides advantageous shifting condition best explained with respect to FIG. 18.

Specifically, as the movable member 116 is moved to position the guide pulley 168 in one of the gear setting positions $P_1$ thru $P_9$, the pivot shaft 58 moves relative to the gears of the gear sprocket set 42 as a result of the orientation of the pivot pins 121 and 123. However, as the pivot shaft 58 is moved, the pivot shaft 58 may not be a constant distance from each gear of the gear sprocket set 42 in each of the gear setting positions $P_1$ thru $P_9$. In other words, in the gear setting position $P_1$ the pivot shaft 58 can be a first distance away from the first gear. In the gear setting position $P_2$ the pivot shaft 58 can be a second distance away from the second gear. In the gear setting position $P_3$ the pivot shaft 58 can be a third distance away from the third gear, and so on, in each of the gear setting positions. However, the first distance, the second distance and third distance (and so on) may not all be equal distances.

For optimal shifting performance it is desirable to maintain the guide pulley 168 at distances away from the specific gear corresponding to each of the gear setting positions $P_1$ thru $P_9$ where variations in the distances are minimized. Minimizing variations in the distances between each gear and the guide pulley 168 is good for derailleur shifting performance. In the present invention, the guide pulley 168 is not rotatably mounted on the pivot shaft 58, but is rotatably mounted on the pulley shaft 166 on the guide plate 62. The pivoting movement of the pulley shaft 166 allows the guide pulley 168 to move relative to the gears in the gear sprocket set 42. In other words, the axis of rotation (the pulley shaft 166) is movable relative to the axis of rotation (the pivot shaft 58) of the tension plate 60 and the guide plate 62. Further, pivoting movement of the guide pulley 168 is directed by the chain C. Specifically, the relative tension and angle of incidence of the chain C relative to the guide pulley 168 determines the pivoted position of the guide pulley 168. Since the guide plate 62 is not biased by a spring, it can pivot without much resistance. As a result, the guide pulley 168 can be positioned in the gear setting position $P_1$ thru $P_9$ at distances $L_1$ thru $L_9$ away from the corresponding gear of the gear sprocket set 42, as indicated in FIG. 18. Using the configuration of the present invention variations in the distances $L_1$ thru $L_9$ are minimized. The specific shifting conditions afforded by the configuration of the present invention provide more desirable shifting conditions.

Figure 16:
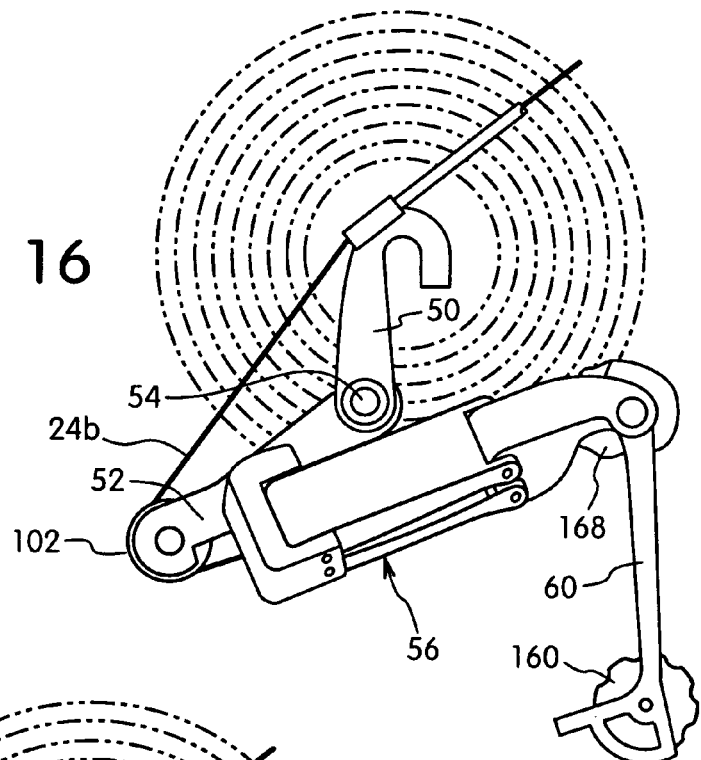
FIG. 16 is a side view of the rear derailleur shown in a first gear setting position in accordance with the present invention.
Figure 17:
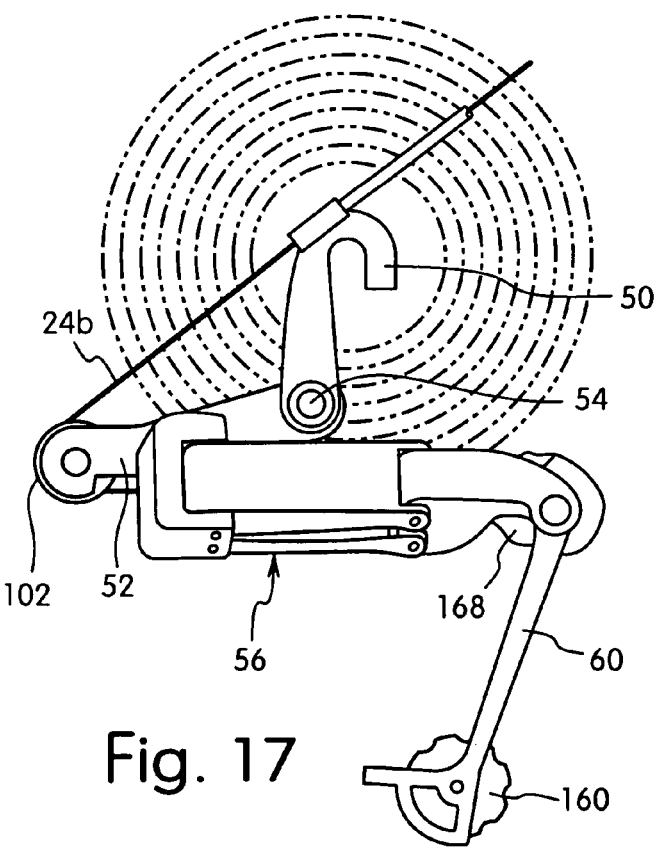
FIG. 17 is a side view of the rear derailleur shown in an offset position enabled for gear shifting into another gear setting position in accordance with the present invention.

Another advantage of the present invention lies in the configuration of the support shaft 54 (also known as the B-shaft). As described above, the base member 52 is free to pivot about the support shaft 54. As a result, if the inner cable 24b is manipulated to shift gear positions by pulling the inner cable 24b while bicycle is stopped, the base member 52 can pivot upward about the support shaft 54. For example, FIG. 16 shows the base member 52 and the derailleur linkage assembly 56 in the gear setting position $P_1$. As the inner cable 24b is pulled, the base member 52 and the derailleur linkage assembly 56 can pivot upward as shown in FIG. 17.

The advantages of the configuration of the support shaft 54 and base member 52 are best understood when a cyclist is at a stop with the chain C and the guide pulley 168 in the gear setting position $P_1$. In the gear setting position $P_1$ the cyclist requires a significant amount of effort in bringing the bicycle 10 back up to speed from a dead stop. The cyclist benefits from having the chain C and the guide pulley 168 in the gear setting position $P_9$ when resuming riding from a dead stop. However, with the bicycle 10 stopped, it is impossible to shift gears because a static chain cannot move from gear to gear in the gear sprocket set 42. The bicycle 10 and the chain C must be in motion in order to shift gears.

However, using the present invention, it is possible for a cyclist to pre-shift. Specifically, the gear shifting mechanism 22 can manipulate the inner cable 24b making it shorter, thereby pulling on the base member 52 moving the base member 52 from the position depicted in FIG. 16 to a position similar to that depicted in FIG. 17. This pre-shifting exerts a force on the derailleur linkage assembly 56 urging the movable member 116 into readiness for shifting from the gear setting position $P_1$ to one of the other gear setting positions. Once the bicycle 10 is in motion, and the chain C begins to move, the chain C is immediately urged by the guide pulley 168 to the selected different gear setting position. The shifting is accomplished easily because the biasing spring 136 biases the tension plate 60 to keep the chain C taut, thereby further biasing the base member 52 back into the position depicted in FIG. 16. In this manner, a pre-shifting is possible using the present invention. More specifically, since the inner cable 24b wraps around the cable idler pulley 102, when the inner cable 24b is pulled, the cable idler pulley 102 acts as a lever point to rotate the base member about the support shaft 54. Further, the support bracket 50 further includes the cable guide portion 72 for guiding the inner cable 24b to ensure adequate leverage for moving the base member 52 during pre-shifting. As well, the support bracket 50 provides additional support for the support shaft 54 to withstand the forces generated by pivoting motion of the base member 52 when pre-shifting.

Another advantage of the present invention is provided by the shape and configuration of the support bracket 50. Since the support bracket 50 includes the recess 76, the rear wheel axle 38 can be rapidly removed and re-installed on the frame 12 of the bicycle 10.

Second Embodiment

Figure 19:
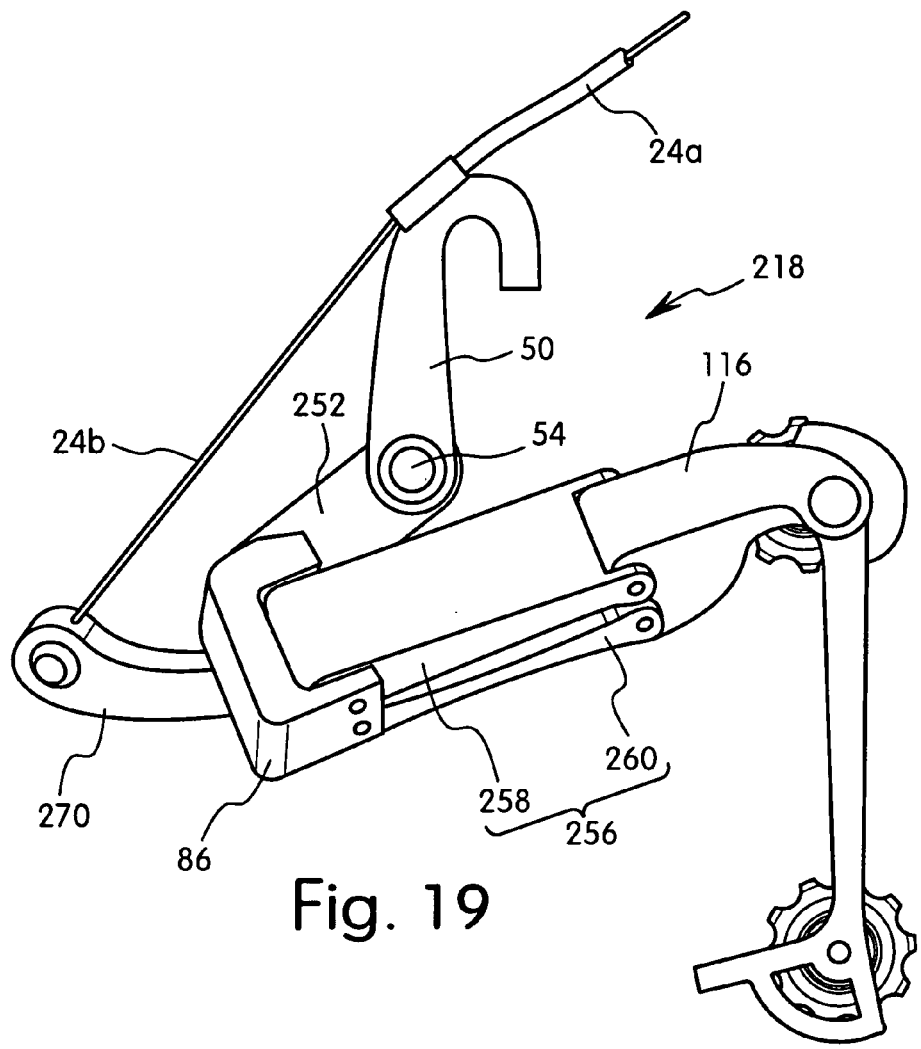
FIG. 19 is a side view of a rear derailleur shown removed from the bicycle frame in accordance with a second embodiment of the present invention.
Figure 20:
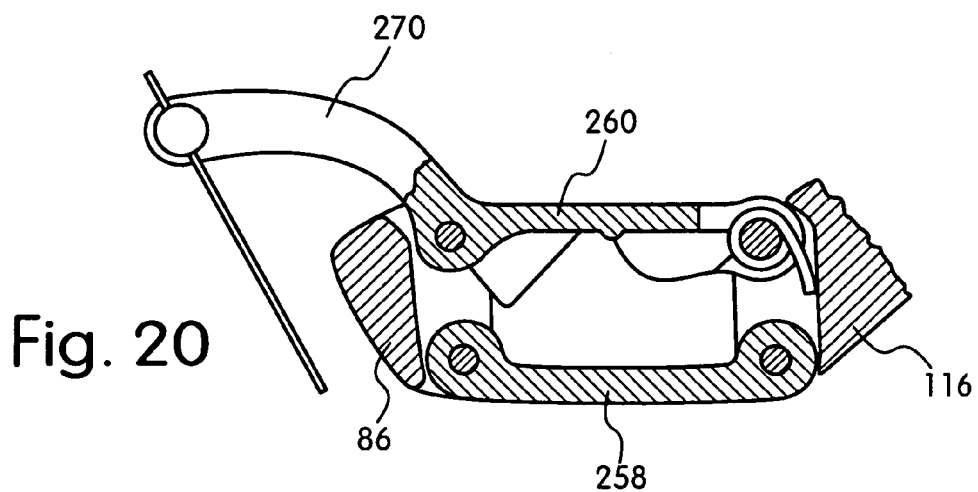
FIG. 20 is a fragmentary cross-sectional view showing features of the rear derailleur in accordance with the second embodiment of the present invention.

Referring now to FIGS. 19 and 20, a rear derailleur 218 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment of the rear derailleur 218 has many features of the first embodiment. For instance, the support bracket 50, including the cable guide portion 72, is the same. However, a base member 252 replaces the base member 52 of the first embodiment. The base member 252 has many of the same features of the base member 52 including the linkage assembly connection portion 86 but does not include the cable idler pulley end 88.

The derailleur linkage assembly 56 of the first embodiment is replaced in the second embodiment with a derailleur linkage assembly 256. The derailleur linkage assembly 256 includes a first pivot link 258 and a second pivot link 260. First ends of the first and second pivot link 258 and 260 are movably coupled to the linkage assembly connection portion 86 of the base member 252 and are movably coupled to the movable member 116. The first pivot link 258 is similar to first pivot link 118 in the first embodiment but does not include a cable attachment portion. However, the second pivot link 260 is formed with an extension arm 270. The extension arm 270 extends rearward with the rear derailleur 218 installed on the bicycle 10.

In the second embodiment, the inner cable 24b is connected to a distal end of the extension arm 270. Pulling of the inner cable 24b causes movement of the first and second pivot links 258 and 260, and hence positioning control of the movable member 116. Further, with the chain C (not shown in FIG. 19) stationary, pulling of the inner cable 24b causes the base member 252 and derailleur linkage assembly 256 to pivot about the support shaft 54 (the B-shaft) in a manner similar to that described above with respect to FIGS. 16 and 17. Otherwise, the features of the rear derailleur 218 are generally the same as or functionally the same as the rear derailleur 18 of the first embodiment.

Third Embodiment

Figure 21:
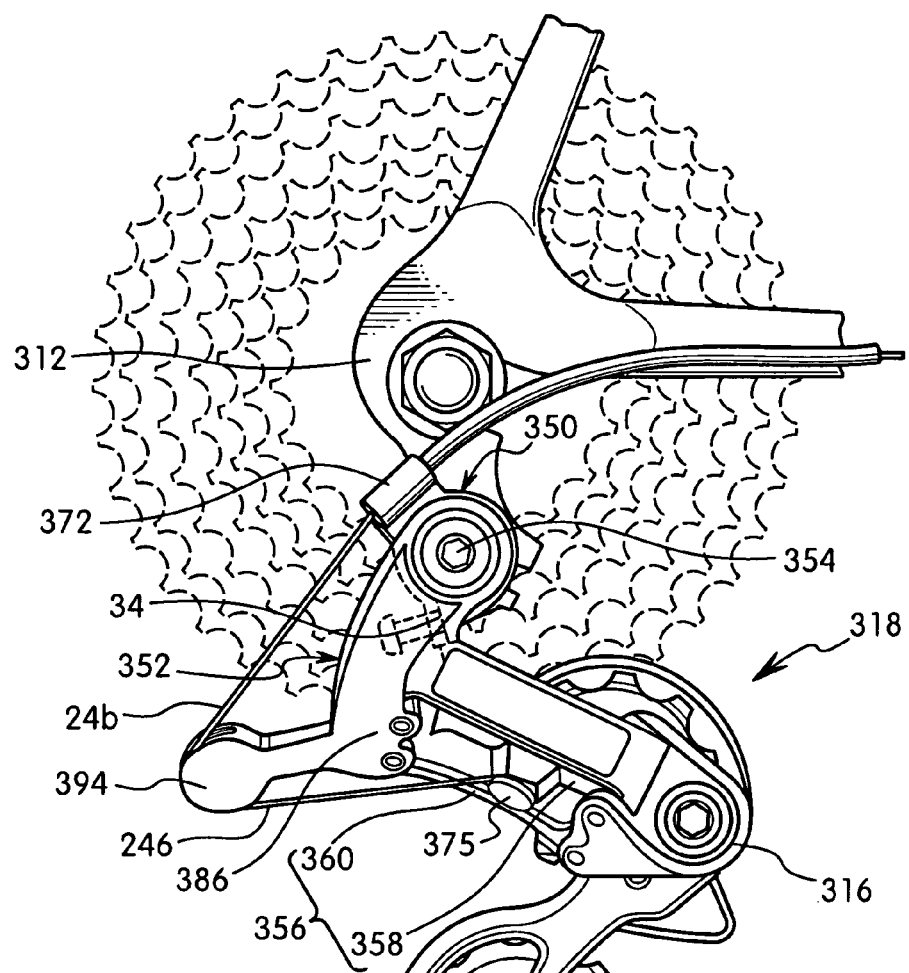
FIG. 21 is side view of a rear derailleur in accordance with a third embodiment of the present invention.
Figure 22:
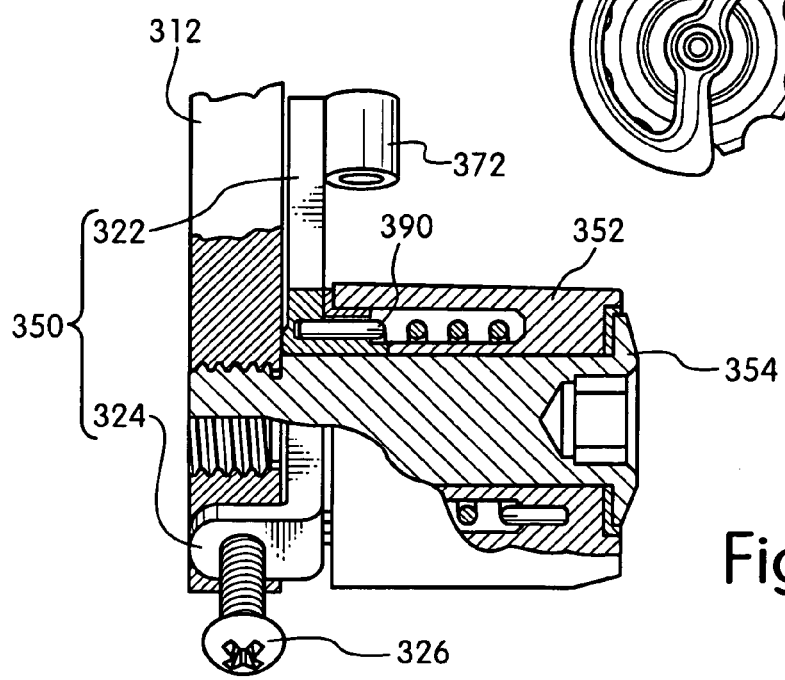
FIG. 22 is a partial cross-section showing details of the rear derailleur in accordance with the third embodiment of the present invention.

Referring now to FIGS. 21 and 22, a rear derailleur 318 in accordance with a second embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The rear derailleur 318 has many features of the first embodiment, and many features that have been modified. For instance, the support bracket 50 is replaced by an outer cable receiving member 350. The outer cable receiving member 350 includes an extension 322 that supports a cable guide portion (an outer cable receiving portion) 372 and also includes an adjuster end 324 that includes an adjuster screw 326 that engages the adjuster engaging surface 34 of a rear end of a bicycle frame 312 such that the outer cable receiving member 350 is non-rotatably engaged with the bicycle frame 312 in a counter clockwise direction in a plane perpendicular to an axis defined by a support shaft 354 as viewed in FIG. 21.

The base member 52 of the first embodiment is replaced by a base member 352 that includes a linkage assembly connection portion 386. The base member 352 is rotatably coupled to the rear end of the bicycle frame 312 by the support shaft 354 at a location spaced apart from the hub axis. A portion of the base member 352 is hollow and retains a biasing spring 390 that biases the outer cable receiving member 350 such that the adjuster screw 326 is biased into engagement with the adjuster engaging surface 34 of the bicycle frame 312. One end of the biasing spring 390 is coupled to the outer cable receiving member 350 and the other end is coupled to the base member 352. The adjuster screw 326 provides a simple structure for adjusting an angular position of the outer cable receiving member 350 and the base member 352 and for adjusting a biasing force applied by the biasing spring 390. In this embodiment, since the outer cable receiving member 350 and the base member 352 are disposed on a common axle (the support shaft 354), structure becomes simpler and more compact.

Unlike the linkage assembly connection portion 86 of the first embodiment, the linkage assembly connection portion 386 does not include the cable idler pulley end 88. Rather, the linkage assembly connection portion 386 includes an extending portion 394 that includes a cable guiding slot for guiding movement of the inner cable 24b.

The derailleur linkage assembly 56 of the first embodiment is replaced in the third embodiment with a derailleur linkage assembly 356. The derailleur linkage assembly 356 includes a first pivot link 358 and a second pivot link 360. First ends of the first and second pivot link 358 and 360 are movably coupled to the linkage assembly connection portion 386 and are movably coupled to a movable member 316. The first pivot link 358 includes an inner cable fixing portion 375 that is connected to the inner cable 24b. Specifically, the inner cable 24b extends from the cable guide portion 372, around the slot formed in the extending portion 394 and to the inner cable fixing portion 375.

In the third embodiment, pulling of the inner cable 24b causes movement of the first and second pivot links 358 and 360, and hence positioning control of the movable member 316. Further, with the chain C (not shown in FIG. 21) stationary, pulling of the inner cable 24b causes the base member 352 and derailleur linkage assembly 356 to pivot about the support shaft 354 (the B-shaft) relative to the outer cable receiving member 350 and the bicycle frame 312 in a manner similar to that described above with respect to FIGS. 16 and 17. Otherwise, the features of the rear derailleur 318 are generally the same as or functionally the same as the rear derailleur 18 of the first embodiment.

Fourth Embodiment

Figure 23:
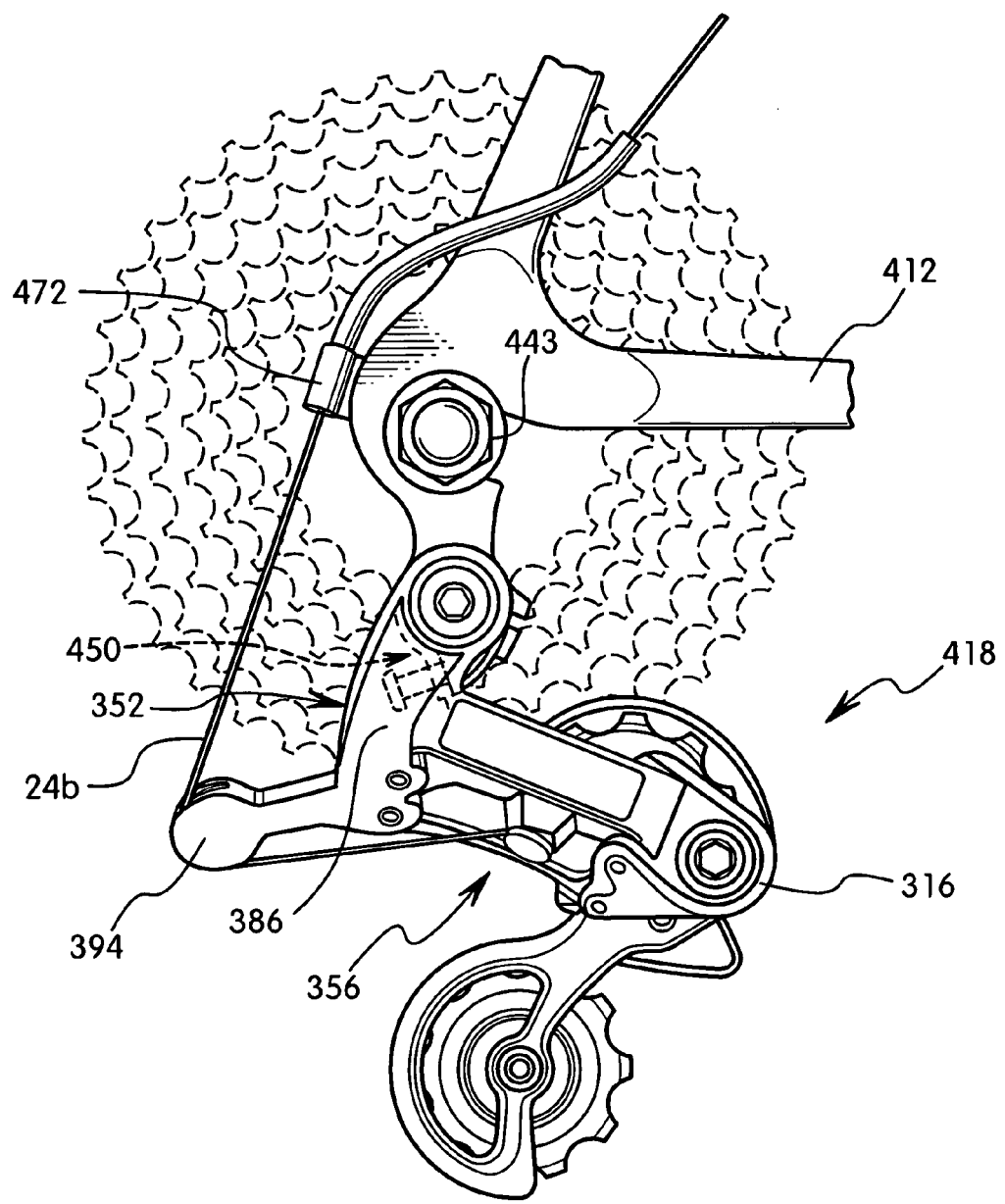
FIG. 23 is a side view of a rear derailleur in accordance with a fourth embodiment of the present invention.

Referring now to FIG. 23, a rear derailleur 418 in accordance with a fourth embodiment will now be explained. In view of the similarity between the third and fourth embodiments, the parts of the fourth embodiment that are identical to the parts of the third embodiment will be given the same reference numerals as the parts of the first embodiment. Moreover, the descriptions of the parts of the fourth embodiment that are identical to the parts of the third embodiment may be omitted for the sake of brevity.

The rear derailleur 418 has many features of the third embodiment, and some features that have been modified. For instance, an outer cable receiving member 472 is separated from an adjuster member 450.

In the fourth embodiment the outer cable receiving member 472 has been formed on a rear end of a bicycle frame 412 by welding, for example. Alternatively, the outer cable receiving member 472 may be fixedly coupled to the rear end of the bicycle frame 412 by a hub nut 443. In this embodiment, the outer cable receiving portion member 472 and the base member 352 are separately and independently fixed to the bicycle frame 412. However, even though the outer cable receiving member 472 is not directly coupled to the base member 352 and the rest of parts of the rear derailleur 418, the outer cable receiving member 472 is regarded as a part of the rear derailleur 418. Otherwise, the features of the rear derailleur 418 are generally the same as the rear derailleur 318 of the third embodiment.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

It should be understood from the drawings and description herein that the rear derailleurs 18, 218, 318 and 418 of the present invention may be used with a gear sprocket set having any of a variety of numbers of gear sprockets and is not limited to use with a gear sprocket set having nine gear sprockets.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:
    a stationary member arranged and configured for non-movable attachment to a bicycle frame, the stationary member including an outer cable receiving portion configured to receive an outer sheath of a control cable assembly;
    a base member pivotally coupled to the stationary member about an axis spaced apart from a hub axis of a rear wheel;
    a linkage mechanism having a first end and a second end, the first end being coupled to the base member and the second end being movable relative to the base member;
    a movable member coupled to the second end of the linkage mechanism;
    a chain guide coupled to the movable member; and
    an inner cable fixing portion coupled to the linkage mechanism, the inner cable fixing portion arranged and configured for attachment of an inner cable of the control cable assembly.

2. The bicycle rear derailleur according to claim 1 wherein the stationary member including a first mounting portion and a second mounting portion spaced apart from one another, the first mounting portion being arranged and configured for attachment to the bicycle frame proximate the hub axis and the second mounting portion of the stationary member coupled to the base member.

3. The bicycle rear derailleur according to claim 1 wherein the base member includes a support portion and a connection portion spaced apart from one another, the support portion being pivotally coupled to the stationary member and the connection portion being coupled to the first end of the linkage mechanism.

4. The bicycle rear derailleur according to claim 3, further comprising
    a cable guide arranged and configured to guide the inner cable between the outer cable receiving portion and the inner cable fixing portion.

5. The bicycle rear derailleur according to claim 4 wherein the cable guide is a cable guide pulley supported on the base member.

6. The bicycle rear derailleur according to claim 5 wherein the connection portion is positioned between the support portion and a cable guide pulley end of the base member, the cable guide pulley end of the base member supporting the cable guide pulley.

7. The bicycle rear derailleur according to claim 1, further comprising
    a cable guide arranged and configured to guide the inner cable between the outer cable receiving portion and the inner cable fixing portion.

8. The bicycle rear derailleur according to claim 7 wherein the cable guide is a cable guide pulley.

9. The bicycle rear derailleur according to claim 1 wherein the base member is arranged and configured to pivot about the axis relative to the stationary member in response to movement of the inner cable.

* * * * *